United States Patent [19]
Felice et al.

[11] 3,868,241
[45] Feb. 25, 1975

[54] MANUFACTURE OF FUSED CAST REFRACTORY WITH STREAMS OF OXYGEN

[75] Inventors: Frank Thomas Felice, Norristown, Pa.; Robert Earl Fisher, Downers Grove; Louis John Jacobs, Chicago, both of Ill.

[73] Assignee: Combustion Engineering Inc., Windsor, Conn.

[22] Filed: June 12, 1973

[21] Appl. No.: 369,343

[52] U.S. Cl. ............... 65/134, 65/DIG. 4, 106/57, 106/65, 264/25, 264/65, 264/82
[51] Int. Cl. .................. C03b 5/16, C04b 35/02
[58] Field of Search ............... 65/134, 32, DIG. 4; 264/25, 65, 82; 106/57, 65

[56] References Cited
UNITED STATES PATENTS

| | | | |
|---|---|---|---|
| 2,387,222 | 10/1945 | Wright | 65/32 |
| 3,079,452 | 2/1963 | Baron et al. | 106/57 X |
| 3,373,240 | 3/1968 | Boeckler et al. | 65/32 X |
| 3,484,258 | 12/1969 | Redwine | 65/32 X |
| 3,689,679 | 9/1972 | Niwa et al. | 65/134 |
| 3,703,391 | 11/1972 | Clishem et al. | 106/65 X |
| 3,716,349 | 2/1973 | Deeg et al. | 65/32 |

*Primary Examiner*—S. Leon Bashore
*Assistant Examiner*—Frank W. Miga
*Attorney, Agent, or Firm*—Richard H. Berneike

[57] ABSTRACT

Fused cast refractories which are formed by melting refractory material in a carbon electrode electric arc furnace followed by casting and annealing are treated with oxygen while in the molten state to place the constituents in the most highly oxidized state. This procedure minimizes the exudation of the glassy matrix of the refractory during service. The raw materials for the refractories may be oxidized before melting by heat treating to reduce the oxygen necessary for oxidizing the molten refractory.

2 Claims, 3 Drawing Figures

3,868,241

MANUFACTURE OF FUSED CAST REFRACTORY WITH STREAMS OF OXYGEN

BACKGROUND OF THE INVENTION

Fused cast refractories are refractories which are formed by electrical fusion followed by casting and annealing. They have excellent resistance to the strongly corrosive action of the highly alkaline materials which are used to make glass and these refractories are therefore used in the construction of glass melting tanks.

A typical fused cast refractory used in glass melting tanks is manufactured by melting alumina, fused zirconia, zircon sand, boric acid and soda ash in a carbon electrode electric arc furnace. This material melts in the temperature range of 3,200°F to 3,300°F. The molten mass is then poured into refractory molds and allowed to cool at a slow rate for a numbers of hours. On solidification the highly refractory and alkaline resistant zirconia and alumina crystalize together. The volume between these crystals contains a glassy matrix which contains the silica, sodium oxide and boric oxide. After cooling, the refractory blocks may be ground with a diamond abrasive to form a smooth surface.

An undesirable consequence of melting with carbon electrodes is the appearance of trace amounts of carbon in the molten bath. Even when a "high arc" is used, in which the electrode is elevated above the molten bath and the arc bridges the gap, a certain amount of ionized carbon is transferred to the molten bath. These trace amounts of carbon have been found to be directly related to the formation of gas bubbles within the solidified refractory blocks. These gas bubbles, which are called blisters, work their way into the glass being melted in the glass melting tank. This gas also has a bloating effect on the glassy phase of the refractory material.

When the fused cast refractory blocks reach a temperature of 2,500°F to 2,900°F during service, the glassy matrix exudes or sweats out of the refractory carrying with it quantities of highly corrosion resistant corundum and zirconia crystals which cause defects in the glass. These defects are known as cords and stones. Stones are defined as mineral inclusions in the glass such as zirconia and corundum. Cords are defined as a glassy inclusion that optically appears different from the parent glass and they are usually enriched by silica, alumina or zirconia. Also, the removal of the glassy matrix from the refractory presents more surface of the refractory for attack by the corrosive action of the molten glass which leads to short refractory service life.

SUMMARY OF THE INVENTION

An object of the present invention is to produce a fused cast refractory in which the tendency for exudation of the glassy matrix phase is minimized. This is accomplished by placing the materials in the refractory in their most highly oxidized state by treating the molten refractory with oxygen. Also, the materials for the refractory before melting may be heat treated to place them in their most highly oxidized state.

DESCRIPTION OF THE PREFERRED EMBODIMENTS

Fused cast refractories such as for use in glass melting tanks, are manufactured by melting materials such as alumina, fused zirconia, zircon sand and other minor constituents in an electric arc furnace. Although the present invention is not limited to any particular fused cast refractory, a typical composition would be:

| | |
|---|---|
| $Al_2O_3$ | 49.2% |
| $ZrO_2$ | 34.5% |
| $SiO_2$ | 15.0% |
| Other | 1.3% |

It has been known that some force other than gravity causes the glassy matrix phase of fused cast refractory to exude during service. A series of tests were conducted to determine the effects of various annealing atmospheres including air, oxygen and carbon monoxide. It was also found that the annealing atmosphere had little or no effect and the exudation of the glassy matrix was high in each case when the immersed electrode melting technique was employed. When the high arc melting technique was employed in which the carbon electrodes never touch the molten bath, exudation was still significant although considerably reduced. It was therefore concluded that the atmosphere exterior of the refractory block during use has no effect on the conditions which cause exudation.

The present invention is based upon the discovery that the refractory blocks have an interior atmosphere of their own which effects the exudation. It has been found that when the constituents of the refractory block, including carbon, are in their most highly oxidized state, there is little or no exudation. This is true when there is an oxidizing interior atmosphere which means that there is excess oxygen either dissolved in the glassy matrix or entrapped in the pore of the block or when there is a neutral interior atmosphere without excess oxygen. This is contrasted to a reducing atmosphere where the constituents are not in their most highly oxidized state (particularly the zirconia and silica) and in which any carbon which is present is in the form of carbon monoxide or elemental carbon. It has been found that the presence of carbon either in the elemental form or as carbon monoxide is the predominant force that contributes to the high exudation of the glassy matrix. This is due to the release of gas from the block during service which forces the glassy matrix to the surface. One factor in this out-gassing process is that carbon will react with silica to produce gaseous silicon monoxide and carbon monoxide.

The oxidizing process of the present invention involves contacting the molten refractory with oxygen after the melting process has been completed and the carbon electrodes removed from the molten bath. Several techniques which can be used to perform this oxidation process will be described hereinafter. Part of the oxidizing process can be accomplished prior to the melting as will also be described hereinafter.

Figure 1:
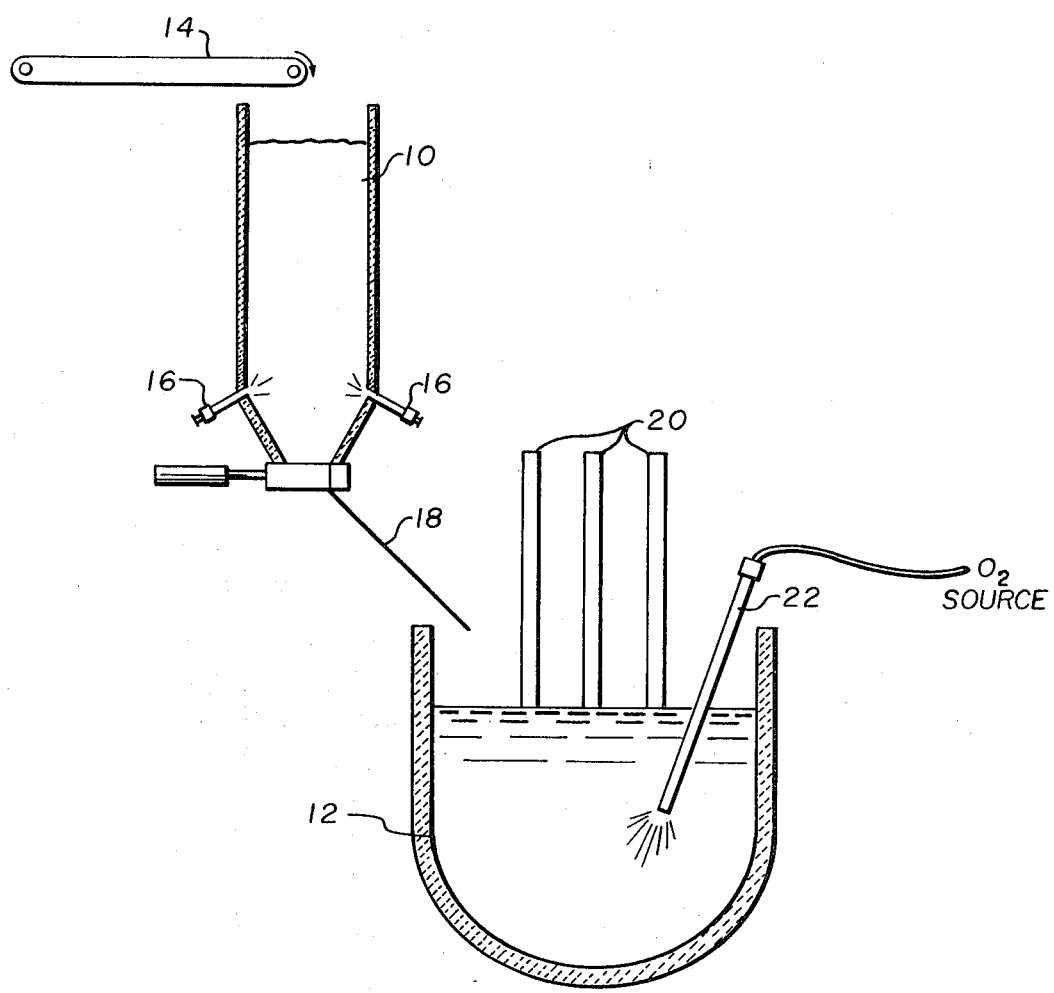
FIG. 1 illustrates a system for producing and treating molten refractory according to the present invention.

FIG. 1 illustrates a system for practicing the present invention comprising a shaft furnace 10 and an electric arc furnace 12. The raw materials for the fused cast refractories are charged into the shaft furnace 10 by means of the belt conveyor 14. The shaft furnace 10 includes the burners 16 which heat the raw materials as they pass through the shaft furnace. This heating process converts all the raw materials to their most highly oxidized state which is particularly beneficial for the zircon which is normally oxygen deficient. It is most desirable to heat the zircon to the point where it will disassociate to zirconia and silica. This disassociation is an endothermic reaction and the disassociated zircon in the raw material batch will achieve more rapid melting of the batch in the electric arc furnace. This more rapid melting will reduce the length of time that the contaminating carbon electrodes are in contact with the molten bath and will also reduce power costs.

The raw materials from the shaft furnace 10 are discharged as needed down the shute 18 into the electric arc furnace 12. The carbon electrodes 20 are then inserted into the charge or, in the case of high arc melting process, are inserted over the charge, and the melting process is carried out. After the refractory charge has been melted, the carbon electrodes are removed from the furnace and oxygen is contacted with the molten refractory material by means of the oxygen lance 22. This oxidation process is carried out until the constituents have been converted to their most highly oxidized state. The amount of oxygen and the length of time necessary for the oxidizing process are dependent upon the particular composition of the raw materials which are used and the amount of carbon which is transferred from the electrodes to the molten bath. After the oxidizing process has been completed the molten refractory material is poured from the electric arc furnace 12 into refractory molds and then annealed in the conventional manner.

Figure 2:
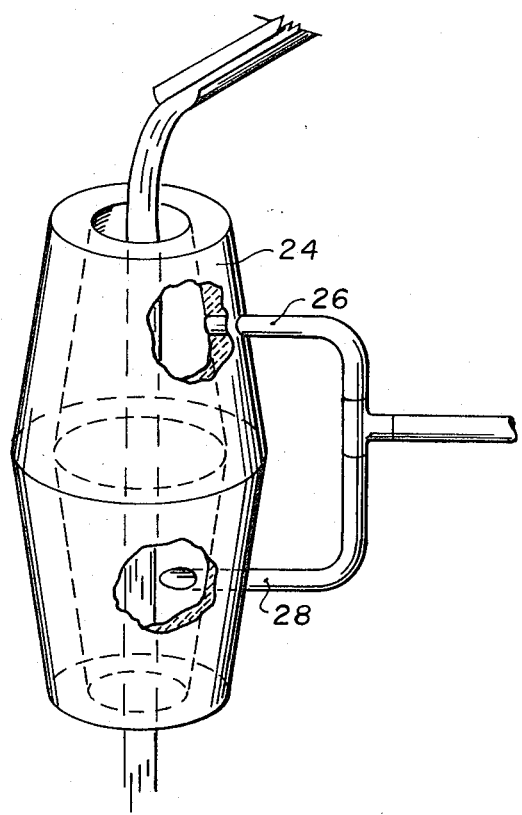
FIGS. 2 and 3 illustrate alternate systems for treating the molten refractory.
Figure 3:
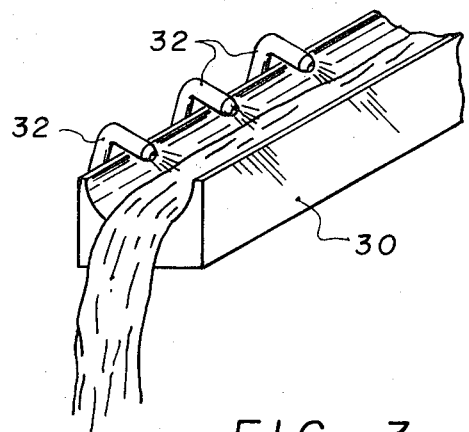

FIGS. 2 and 3 illustrate alternate systems for oxidizing the molten refractory. Each of these systems oxodizes the refractory as it is poured from the electric arc furnace 12. As shown in FIG. 2, the molten stream of refractory is poured down through a chamber 24. The oxygen nozzle 26 in the upper portion of the chamber is oriented so as to impinge a jet of oxygen onto the stream of molten refractory. This produces intimate contact between the oxygen and the refractory and thus increases the reaction rate and the absorption of oxygen by the refractory. In the lower portion of the chamber 24 the oxygen nozzle 28 is oriented so as to introduce a stream of oxygen tangentially into the chamber. This has the effect of smoothing out the stream of refractory so that a confined stream will leave the chamber 24 into the mold (not shown) with a minimum of splash.

FIG. 3 illustrates a pour spout or trough 30 through which the molten refractory is transferred from the electric arc furnace to the mold. As the refractory is flowing through the spout 30, a plurality of jets of oxygen are directed onto the flowing stream. The number of jets and the amount of oxygen used may be selected to produce the amount of oxidation necessary for the particular refractory material.

The invention has been described with reference to the use of oxygen for the oxidizing process. This is intended to cover the use of pure oxygen and air as well as oxygen enriched air. The use of pure or relatively pure oxygen is preferred since it would understandably be more efficient.

Although several specific embodiments and techniques have been described for practicing the present invention it will be understood that these are merely illustrative and that changes in the system and techniques may be made without departing from the scope of the invention as claimed.

What is claimed is:

1. A method of producing a molten refractory material for use in forming fused cast refractories comprising the steps of:
   a. providing refractory raw materials consisting essentially of alumina, zirconia and silica for producing fused cast refractories;
   b. melting said refractory raw materials in an electric arc furnace having carbon electrodes whereby some of said carbon is transferred to said molten refractory;
   c. flowing said molten refractory from said electric arc furnace; and
   d. directing a stream of oxygen onto said molten refractory material as it is being poured.

2. A method as recited in claim 7 wherein said molten refractory material is poured in a free falling stream and wherein said step of directing a stream of oxygen onto said molten refractory material comprises the steps of:
   a. impinging a first stream of oxygen directly on said free falling stream to break up said stream and produce intimate contact between said oxygen and said molten refractory material and
   b. directing a second stream of oxygen tangentially around said free falling stream to consolidate said broken-up free falling stream.

* * * * *